United States Patent Office 3,297,790
Patented Jan. 10, 1967

3,297,790
PROCESS AND COMPOSITION FOR CURING SELECTED THIOCARBOXYLIC ACID FLUORIDE POLYMERS AND THE CURED POLYMERS
Donald S. Acker, Augusta County, Va., assignor to E. I. du Pont de Nemours and Company, Wilmington, Del., a corporation of Delaware
No Drawing. Filed Apr. 2, 1965, Ser. No. 445,232
17 Claims. (Cl. 260—874)

This application is a continuation-in-part of my copending application Serial No. 106,511, filed May 1, 1961, and now abandoned.

This invention relates to, and has as its principal objects provision of, novel vulcanizable, i.e., curable, polymeric compositions, conversion of the same to vulcanized products, and the products themselves.

The vulcanization, or curing, of certain types of polymeric materials is well known. For example, natural and synthetic rubbers are vulcanized by means of sulfur and metallic oxides. Likewise, certain vinyl polymers that contain hydrogen atoms in their molecules are vulcanized by the use of azo or peroxide compounds that liberate free radicals. Thiocarboxylic acid fluoride polymers that have no hydrogen atoms in their molecules form a new class of polymeric materials useful in various applications; such thioacyl fluoride polymers could be used in many other applications if they could be vulcanized or cured to improve their elastomeric properties.

New vulcanizable compositions comprising thiocarboxylic acid fluoride polymers having no hydrogen atoms in their molecules, and a method for their vulcanization are provided by the present invention. The novel vulcanizable compositions comprise: (1) a thiocraboxylic acid fluoride polymer having no hydrogen atoms in the molecule, including both homopolymers, inter se copolymers of two or more such thioacyl fluorides having thiocarbonyl,

groups and no hydrogen, and copolymers of such thioacyl fluorides with hydrogen-free ethylenically unsaturated monomers in which the thioacyl fluoride component amounts to at least 50 mole percent; (2) from 0.1 to 10%, based on the weight of the thioacyl fluoride polymer, of a free-radical generator; and (3) from 0.5 to 25% based on the weight of the said colymer, of a free-radical acceptor. These vulcanizable compositions are cured by subjecting them to a temperature that liberates free radicals from the free-radical generator for a length of time sufficient to obtain vulcanization, or curing, of the polymer.

The ability of these hydrogen-free polymers to be vulcanized is quite surprising. The hitherto known free-radical vulcanization of polymers has always involved polymers containing hydrogen atoms that could be abstracted from the carbon atoms of the polymer chains by the free-radical catalyst to produce crosslinking in the vulcanized, or cured, polymer.

The vulcanizable compositions of this invention are conveniently prepared by uniformly mixing the thioacyl fluoride polymer, i.e., either a homopolymer or a copolymer of the above-defined types, with a free-radical generator and a free-radical acceptor on a rubber mill or in a mutual solvent, e.g., chloroform.

The thiocarboxylic acid fluoride polymers useful in preparing the vulcanizable compositions of this invention include homopolymers of any hydrogen-free thiocarboxylic acid fluoride, copolymers of any two or more such thioacyl fluorides, or copolymers of any such thioacyl fluoride with one or more hydrogen-free, ethylenically unsaturated monomers in which the copolymer contains at least 50 mole percent of the thioacyl fluoride monomer. Specific examples of such thioacyl fluoride homopolymers that are useful include the homopolymers of fluoroperhalothioacyl fluorides, e.g., thiocarbonyl fluoride, thiocarbonyl chloride fluoride, trifluorothioacetyl fluoride, chlorodifluorothioacetyl fluoride, dichlorofluorothioacetyl fluoride, pentafluorothiopropionyl fluoride, and pentafluorothio-3-butenoyl fluoride. Specific copolymers that can be used include copolymers of two or more of any of the preceding perhalothioacyl fluorides or of any of these thioacyl fluorides with one or more hydrogen-free ethylenically unsaturated compounds such as, for example, tetrafluoroethylene, chlorotrifluoroethylene, and the like, and in which the thioacyl fluoride moiety of the copolymer amounts to at least 50 mole percent.

The free-radical generators useful in the vulcanizable compositions and vulcanizing process of this invention include the organic peroxides and the azobisaliphatic nitriles. Specific examples of organic peroxides that are operable include dicumyl peroxide, dibenzoyl peroxide, di-t-butyl peroxide, cumene hydroperoxide, methyl ethyl ketone peroxide,t-butyl perbenzoate and di-N-methyl-t-butyl percarbamate. Specific azonitriles that are operable include α,α'-azobis (α,γ-dimethylvaleronitrile), α,α'-azobis(α-cyclopropylpropionitrile) and α,α'-azobis(cyclohexanecarbonitrile). The quantity of free-radical generator used in the compositions of this invention will depend on the degree of cure desired and the reactivity of the polymer being cured. In general, a quantity of free-radical generator amounting to at least 0.1% of the weight of the polymer is required and quantities ranging up to 10% of the weight of the polymer can be used if desired. Preferably the proportions of the free-radical generator ranging from 1% to 2% give satisfactory results. The free-radical acceptors which are used in conjunction with the free radical generators in the compositions and the process of this invention are compounds which will react with free radical generated in the polymers.

Specific types of free-radical acceptors that are operable include the N-substituted maleimides, the N,N'-substituted bismaleimides, bisacrylamides and cyclic trisacrylamides. The N-substituted maleimides have the formula

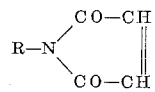

wherein R is an alkyl or an aryl radical. Representative N-substituted maleimides include N-methyl maleimide, N-ethyl maleimide, N-dodecyl maleimide, N-stearyl maleimide, N-phenyl maleimide, N-naphthyl maleimide, N-biphenyl maleimide and N-pyrenyl maleimide. The N,N'-substituted bismaleimides have the formula

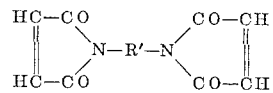

whrein R' is an alkylene or arylene radical. Representative N,N'-bismaleimides include N,N'-methylene bismaleimide, N,N'-ethylene bismaleimide, N,N'-tetramethylene bismaleimide, N,N'-hexamethylene bismaleimide, N,N'-p-phenylene bismaleimide, N,N'-m-phenylene bismaleimide, N,N'-naphthylene bismaleimide and N,N'-pyrenylene bismaleimide. The bisacrylamides have the formula

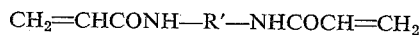

wherein R' is an alkylene or an arylene radical. Representative bisacrylamides include N,N'-methylene bisacrylamide, N,N'-ethylene bisacrylamide, N,N'-tetramethylene bisacrylamide, N,N'-hexamethylene bisacrylamide, N,N'-m-phenylene bisacrylamide, N,N'-p-phenylene bisacrylamide, and N,N'-naphthylene bisacrylamide. The cyclic trisacrylamide known as hexahydrotrisacryloyl triazine or triacrylylhexahydro-3-triazine has the formula

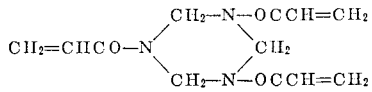

As in the case of the free-radical generators, the quantity of free-radical acceptor used will depend on the degree of cure desired and the reactivity of the polymer being cured. In general, amounts of free-radical acceptors ranging from 0.5% to 25% of the weight of the polymer can be used. Amounts of these ranging from 2% to 10% are preferred since they generally give the best results.

The vulcanizable compositions of this invention are cured by heating the compositions at temperatures at which the particular free-radical generators liberate free radicals. Temperatures ranging from about 50° to 150° C. are generally satisfactory. The exact temperature chosen is dependent on the particular polymer, free-radical generator and free-radical acceptor being used. The heating of the composition is continued for a length of time sufficient to obtain a satisfactory cure of the polymer. Times ranging from 5 minutes to several hours are generally satisfactory. The use of pressure in the curing step is not essential. The compositions are cured simply by the application of the required amount of heat. However, it is convenient to cure the polymer composition and shape it into the desired form by means of pressure while the curing is taking place. For this purpose, pressures ranging from atmospheric up to 10,000 lb./sq. in. or more are satisfactory.

When a solvent is used to obtain uniform mixtures of the thioacyl fluoride polymer and the free-radical generator and free-radical acceptor, it is not essential to use an amount of solvent sufficient to produce a fluid solution of the polymer. An amount of solvent only sufficient to produce a swollen gel of the polymer is operable in this process. The use of a solvent is not essential as it is merely an aid in obtaining uniform compositions. Typical solvents that can be used include chloroform, carbon tetrachloride, pentane, xylene, tetrahydrofuran, and the like. The particular solvent employed in any particular case depends on the solubility characteristics of the particular thioacyl fluoride polymer being used.

The thioacyl fluoride polymers used as starting materials for the compositions of this invention can be made by various methods. For example, poly(thiocarbonyl fluoride) can be prepared by polymerizing thiocarbonyl fluoride in bulk or in solution in the presence of anionic initiators at temperatures ranging from −180° up to about 0° C. Copolymers of thiocarbonyl fluoride with other polymerizable thioacyl fluoride monomers are prepared in the same general manner. The preparation of polymers of thiocarbonyl fluoride are disclosed in greater detail in U.S. Patents 2,980,695 and 3,240,765 and application Serial No. 817,976, filed June 4, 1959, and now abandoned. Polymers of α-fluoroperhalothioacyl fluorides, including homopolymers and inter se copolymers of such monomers, are prepared by contacting the monomer or monomer mixture with an anionic initiator at a temperature between 0° and −120° C. in the presence of a solvent such as an ether, e.g., diethyl ether, or tetrahydrofuran. The preparation of such polymers is described in greater detail in U.S. Patent 3,069,395 by W. J. Middleton. Copolymers of the hydrogen-free thioacyl fluorides with hydrogen-free ethylenically unsaturated monomers can be prepared by heating a mixture of the thioacyl fluoride, e.g., thiocarbonyl fluoride, and the ethylenically unsaturated monomer, e.g., tetrafluoroethylene, in an inert solvent, e.g., fluorotrichloromethane, with a free radical-liberating initiator, e.g., benzoyl peroxide, di-t-butyl peroxide, dinitrogen difluoride, or α,α'-azodiisobutyronitrile, under anhydrous, oxygen-free conditions at a temperature at which the initiator liberates free radicals, e.g., 25–135° C. and under an elevated pressure, e.g., 1000–3000 atmospheres.

The vulcanizable compositions of this invention and the method for curing them are illustrated in further detail in the following examples in which the quantities of ingredients are expressed in parts by weight unless otherwise indicated.

EXAMPLE I

Two parts of N,N'-m-phenylene bismaleimide and 1 part of dicumyl peroxide are milled into 100 parts of a copolymer of monochlorodifluorothioacetyl fluoride and thiocarbonyl fluoride containing approximately 95 mole percent of thiocarbonyl fluoride on a rubber mill at room temperature. A portion of the milled stock is press-cured at 150° C. and contact pressure for 15 minutes. The resulting vulcanizate does not dissolve in chloroform.

EXAMPLE II

Two parts of triacrylylhexahydro-s-triazine and 0.5 part of dicumyl peroxide are milled into 100 parts of poly(thiocarbonyl fluoride) on a rubber mill at room temperature. The milled sheet obtained is divided into several portions and three of these portions are heated in a press at contact pressure for 15 minutes at temperatures of 150° C., 175° C. and 200° C. Other portions of the milled sheet are cured at 150° C. for one hour and at 200° C. under nitrogen atmosphere for 2 hours. All the heated samples show evidence of cross-linking since the heated polymer is no longer soluble in chloroform.

EXAMPLE III

Triacrylylhexahydro-s-triazine in varying amounts (10, 5 and 2 parts) and 1 part of α,α'-azodiisobutyronitrile are milled into 100 parts of poly(thiocarbonyl fluoride) on a rubber mill at room temperature. These compositions are then press-cured in a press heated at 100° C. under 12,000 lb./sq. in. pressure for 1 hour. The cured compositions have much better elastomeric properties, as judged by hand testing, than the uncured polymer. The cured polymers are no longer soluble in tetrachloroethylene.

EXAMPLE IV

A mixture of 100 parts of a finely ground sample of poly(thiocarbonyl fluoride), 5 parts of m-phenylene bismaleimide, 2 parts of α,α'-azodiisobutyronitrile and 750 parts of chloroform is allowed to stand at room temperature (about 25° C.) until a uniform gel is obtained, about 20 hours being required. The chloroform is removed from the gel by pressing the gel into a sheet at 50° C. The polymer is cured by heating the pressed sheet at 100° C. under 5,000 lb./sq. in. pressure for 1 hour. The resulting cured polymer does not dissolve in chloroform and has improved elastomeric characteristics compared with the uncured polymer.

EXAMPLE V

The procedure of Example IV is repeated with the exception that triacrylylhexahydro-s-triazine is substituted for the m-phenylene bismaleimide. The cured composition has greatly improved elastomeric characteristics compared with the uncured polymer.

The vulcanizable compositions of this invention and their vulcanized products can also include other additives. For example, they can be modified with other elastomers, e.g., natural rubber, styrene-butadiene copolymers, chloroprene polymers, butadiene-acrylonitrile copolymers, and other synthetic rubbers. They can also contain conventional fillers such as carbon black or silica in the proportions commonly employed in elastomer applications.

The vulcanized thioacyl fluoride compositions of this invention are useful in various applications because of the particular combination of properties they possess. The vulcanized thioacyl fluoride elastomers obtained by the process of this invention are particularly useful in those applications for which elastomers are usually employed. For example, the cured polymers are useful as elastic fibers, elastic films, elastic coatings for other films and for fabrics, flexible sheeting and tubing and the like. In their application as coatings the vulcanizable compositions of this invention can be applied to a substrate and then cured to form the insoluble elastomeric coating.

Since obvious modifications and equivalents in the invention will be evident to those skilled in the chemical arts, I propose to be bounded solely by the appended claims.

The embodiments of the invention in which an exclusive property or privilege is claimed are defined as follows:

1. The process of curing a polymer of a hydrogen-free thiocarboxylic acid fluoride of the group consisting of thiocarbonyl fluoride, thiocarbonyl chloride fluoride, trifluorothioacetyl fluoride, chlorodifluorothioacetyl fluoride, dichlorofluorothioacetyl fluoride, pentafluorothiopropionyl fluoride, and pentafluorothio-3-butenoyl fluoride which comprises reacting the same with 0.5 to 25% by weight, based on the weight of the polymer, of a free-radical acceptor selected from the group consisting of N-substituted maleimides, N,N'-substituted bismaleimides, bisacrylamides and cyclic trisacrylamides in the presence of a free-radical generator, said polymer being of the class consisting of the homopolymers of said acid fluorides, the copolymers of at least two of said acid fluorides, and the copolymers of the same with at least one ethylenically unsaturated hydrogen-free monomer containing at least 50% of thiocarboxylic acid fluoride moiety.

2. The process of claim 1 wherein the polymer is a copolymer of thiocarbonyl fluoride and monochlorodifluorothioacetyl fluoride.

3. The process of claim 1 wherein the polymer is poly(thiocarbonyl fluoride).

4. The process of claim 1 wherein the free-radical acceptor is N,N'-m-phenylene bismaleimide.

5. The process of claim 1 wherein the free-radical acceptor is triacrylylhexahydro-s-triazine.

6. The process of claim 1 wherein the free-radical acceptor is m-phenylene bismaleimide.

7. The process of claim 1 wherein the free-radical generator is dicumyl peroxide.

8. The process of claim 1 wherein the free-radical generator is α,α'-azodiisobutyronitrile.

9. A polymer of a hydrogen-free thiocarboxylic acid fluoride of the group consisting of thiocarbonyl fluoride, thiocarbonyl chloride fluoride, trifluorothioacetyl fluoride, chlorodifluorothioacetyl fluoride, dichlorofluorothioacetyl fluoride, pentafluorothiopropionyl fluoride, and pentafluorothio-3-butenoyl fluoride cured by reaction with 0.5 to 25% by weight, based on the weight of the polymer, of a free-radical acceptor selected from the group consisting of N-substituted maleimides, N,N'-substituted bismaleimides, bisacrylamides and cyclic trisacrylamides in the presence of a free-radical generator, said polymer being of the class consisting of the homopolymers of said acid fluorides, the copolymers of at least two of said acid fluorides, and the copolymers of the same with at least one ethylenically unsaturated hydrogen-free monomer containing at least 50% of thiocarboxylic acid fluoride moiety.

10. A copolymer of thiocarbonyl fluoride and monochlorodifluorothioacetyl fluoride cured by reaction with from 0.5 to 25% by weight, based on the weight of the polymer, of a free-radical acceptor selected from the group consisting of N-substituted maleimides, N,N'-substituted bismaleimides, bisacrylamides and cyclic trisacrylamides in the presence of a free-radical generator.

11. A copolymer of claim 10 wherein the free-radical acceptor is N,N'-m-phenylene bismaleimide.

12. A poly(thiocarbonyl fluoride) cured by reaction with from 0.5 to 25% by weight, based on the weight of the polymer, of a free-radical acceptor selected from the group consisting of N-substituted maleimides, N,N'-substituted bismaleimides, bisacrylamides and cyclic trisacrylamides in the presence of a free-radical generator.

13. A poly(thiocarbonyl fluoride) of claim 12 wherein the free-radical acceptor is triacrylhexahydro-s-triazine.

14. A poly(thiocarbonyl fluoride) of claim 12 wherein the free-radical acceptor is m-phenylene bis(maleimide).

15. A vulcanizable composition of matter comprising:
   (1) a polymer of a hydrogen-free thiocarboxylic acid fluoride of the group consisting of thiocarbonyl fluoride, thiocarbonyl chloride fluoride, trifluorothioacetyl fluoride, chlorodifluorothioacetyl fluoride, dichlorofluorothioacetyl fluoride, pentafluorothio propionyl fluoride, and pentafluorothio-3-butenoyl fluoride, said polymer being of the class consisting of the homopolymers of said acid fluorides, the copolymers of at least two of said acid fluorides, and the copolymers of the same with at least one ethylenically unsaturated hydrogen-free monomer containing at least 50% of thiocarboxylic acid fluoride moiety;
   (2) 0.5–25% by weight, based on the weight of the aforesaid polymer, of a free-radical acceptor selected from the group consisting of N-substituted maleimides, N,N'-substituted bismaleimides, bisacrylamides and cyclic tritrisacrylamides; and
   (3) an effective amount of a free-radical generator.

16. The composition of claim 15 in which the polymer is a copolymer of thiocarbonyl fluoride and monochlorodifluorothioacetyl fluoride.

17. The composition of claim 15 in which the polymer is poly(thiocarbonyl fluoride).

References Cited by the Examiner
UNITED STATES PATENTS 2,958,672 11/1960 Goldberg _____ 260—875
3,069,395 12/1962 Middleton _____ 260—33.2

MURRAY TILLMAN, *Primary Examiner.*

SAMUEL H. BLECH, *Examiner.*

M. FOELAK, *Assistant Examiner.*